US011952820B1

(12) United States Patent
Snider et al.

(10) Patent No.: US 11,952,820 B1
(45) Date of Patent: Apr. 9, 2024

(54) SLIDER WINDOW ASSEMBLY WITH MOVABLE PANEL DRIVE SYSTEM

(71) Applicant: Magna Mirrors of America, Inc., Holland, MI (US)

(72) Inventors: Darin J. Snider, Holland, MI (US); Peggy L. Gustafson, Holland, MI (US); Troy F. Tooker, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 242 days.

(21) Appl. No.: 17/305,818

(22) Filed: Jul. 15, 2021

Related U.S. Application Data

(60) Provisional application No. 62/705,767, filed on Jul. 15, 2020.

(51) Int. Cl.
*B60J 1/00* (2006.01)
*B60J 1/18* (2006.01)
*E05F 15/652* (2015.01)
*H05B 3/86* (2006.01)

(52) U.S. Cl.
CPC ........... *E05F 15/652* (2015.01); *B60J 1/1853* (2013.01); *H05B 3/86* (2013.01); *E05Y 2900/55* (2013.01)

(58) Field of Classification Search
CPC .............................. E05F 15/652; B60J 1/1853
See application file for complete search history.

(56) References Cited

U.S. PATENT DOCUMENTS

| | | | |
|---|---|---|---|
| 3,917,502 A | 11/1975 | Shirasaka et al. | |
| 4,674,231 A | 6/1987 | Radek et al. | |
| 4,920,698 A | 5/1990 | Friese et al. | |
| 4,995,195 A | 2/1991 | Olberding et al. | |
| 5,146,712 A | 9/1992 | Hlavaty | |
| 5,531,046 A | 7/1996 | Kollar et al. | |
| 5,557,888 A | 9/1996 | Ruchat et al. | |
| 5,572,376 A | 11/1996 | Pace | |
| 5,644,869 A | 7/1997 | Buchanan, Jr. | |
| 5,669,181 A | 9/1997 | Kollar et al. | |
| 5,784,833 A | 7/1998 | Sponable et al. | |
| 5,799,444 A | 9/1998 | Freimark et al. | |
| 5,822,922 A | 10/1998 | Grumm et al. | |

(Continued)

FOREIGN PATENT DOCUMENTS

EP 881409 A1 12/1998

*Primary Examiner* — Daniel J Troy
*Assistant Examiner* — Daniel Alvarez
(74) *Attorney, Agent, or Firm* — HONIGMAN LLP

(57) ABSTRACT

A vehicular slider window assembly includes a frame portion, a fixed window panel fixed relative to the frame portion, and a movable window panel. A drive system is operable to move the movable window panel between an opened position and a closed position. The drive system includes (i) a housing attached at the fixed window panel, (ii) a drive motor disposed in the housing, (iii) a threaded shaft disposed in the housing and rotatably driven by the drive motor, (iv) a connecting element that threadedly receives the threaded shaft therethrough and (v) a window connector that is affixed to the movable window panel and that pivotally connects to the connecting element. Rotation of the threaded shaft imparts a translational movement of the connecting element along the threaded shaft to move the movable window panel between the opened and closed positions.

10 Claims, 9 Drawing Sheets

(56) References Cited

U.S. PATENT DOCUMENTS

| | | |
|---|---|---|
| 5,826,377 A | 10/1998 | Simson et al. |
| 5,996,284 A | 12/1999 | Freimark et al. |
| 6,018,913 A | 2/2000 | Lin |
| 6,021,605 A | 2/2000 | Laux et al. |
| 6,026,611 A | 2/2000 | Ralston et al. |
| 6,038,819 A | 3/2000 | Klein |
| 6,112,462 A | 9/2000 | Kolar |
| 6,119,401 A | 9/2000 | Lin et al. |
| 6,119,402 A | 9/2000 | Wisner |
| 6,560,929 B1 | 5/2003 | Staser et al. |
| 6,591,552 B1 | 7/2003 | Rasmussen |
| 6,691,464 B2 | 2/2004 | Nestell et al. |
| 6,810,622 B2 | 11/2004 | Oberheide |
| 6,918,208 B2 | 7/2005 | Oberheide et al. |
| 6,955,009 B2 | 10/2005 | Rasmussen |
| 7,003,916 B2 | 2/2006 | Nestell et al. |
| 7,073,293 B2 | 7/2006 | Galer |
| 7,185,943 B2 | 3/2007 | Lesle et al. |
| 7,410,201 B1 | 8/2008 | Wilson et al. |
| 7,584,574 B2 | 9/2009 | Kinross et al. |
| RE41,502 E | 8/2010 | Neaux |
| 7,861,462 B2 | 1/2011 | Smith et al. |
| 8,151,519 B2 | 4/2012 | Bello et al. |
| 8,240,087 B2 | 8/2012 | Kinross |
| 8,402,695 B2 | 3/2013 | Smith et al. |
| 8,474,186 B2 | 7/2013 | Dufour et al. |
| 8,510,993 B2 | 8/2013 | Mellary et al. |
| 8,813,425 B2 | 8/2014 | Ash, Jr. et al. |
| 8,881,458 B2 | 11/2014 | Snider et al. |
| 8,915,018 B2 | 12/2014 | Snider |
| 8,935,887 B2 | 1/2015 | Cavalcante |
| 8,938,914 B2 | 1/2015 | Hulst et al. |
| 9,160,220 B2 | 10/2015 | Cavalcante |
| 9,518,420 B2 | 12/2016 | Kondo |
| 9,579,955 B2 | 2/2017 | Snider |
| 9,579,956 B2 | 2/2017 | Sudou et al. |
| 10,501,977 B2 | 12/2019 | Snider et al. |
| 10,524,313 B2 | 12/2019 | Snider et al. |
| 2002/0148163 A1 | 10/2002 | Warner et al. |
| 2003/0213179 A1 | 11/2003 | Galer |
| 2004/0020131 A1 | 2/2004 | Galer et al. |
| 2006/0080893 A1* | 4/2006 | Lesle .................. E05F 15/652 49/413 |
| 2006/0107600 A1 | 5/2006 | Nestell et al. |
| 2007/0234644 A1 | 10/2007 | Jaeger et al. |
| 2008/0127563 A1 | 6/2008 | Tooker |
| 2008/0163553 A1 | 7/2008 | Liao |
| 2008/0229667 A1 | 9/2008 | Dufour et al. |
| 2009/0025296 A1 | 1/2009 | Petner |
| 2010/0263290 A1 | 10/2010 | Pawloski et al. |
| 2011/0120019 A1 | 5/2011 | Smith et al. |
| 2014/0047772 A1 | 2/2014 | Hulst |
| 2016/0208536 A1* | 7/2016 | Gipson .............. E05D 15/0621 |
| 2017/0356231 A1* | 12/2017 | Snider .................. E05F 15/635 |
| 2018/0079379 A1 | 3/2018 | Snider et al. |
| 2019/0299762 A1 | 10/2019 | Hiramatsu |
| 2019/0383084 A1 | 12/2019 | Snider et al. |
| 2021/0355737 A1 | 11/2021 | Snider et al. |

\* cited by examiner

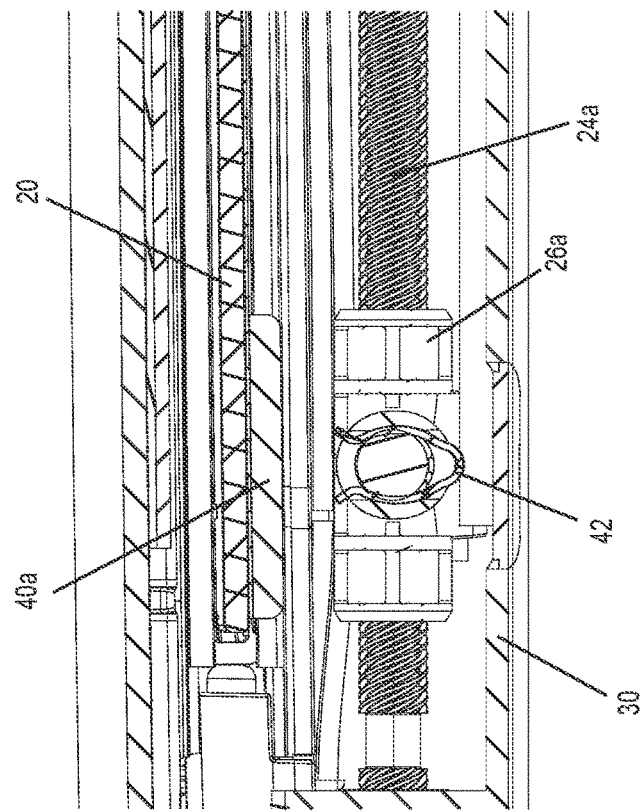
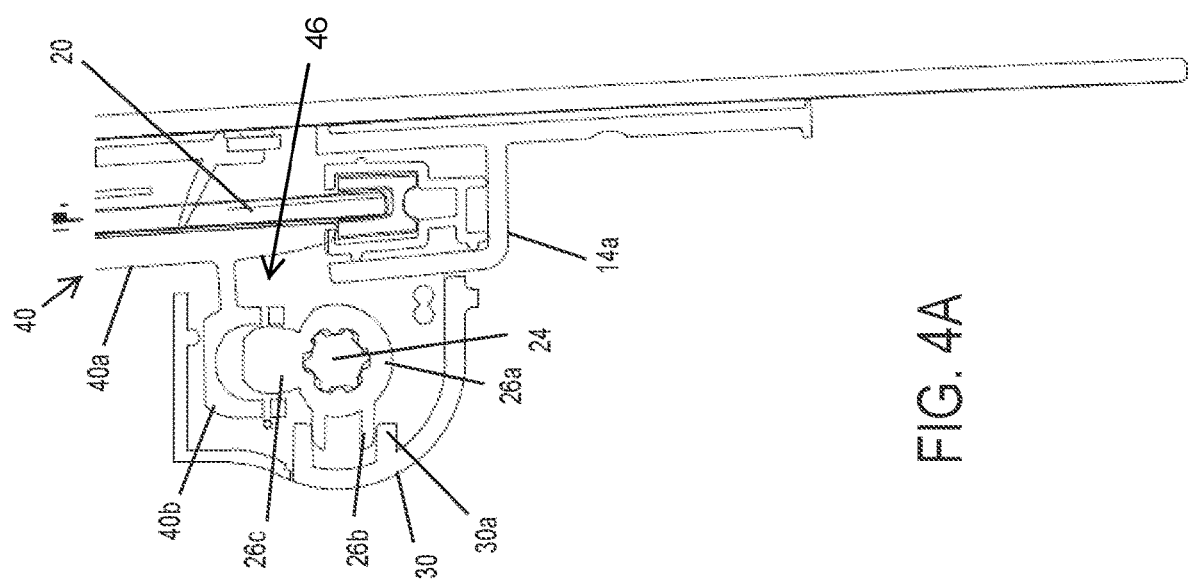
FIG. 4B
FIG. 4A

SLIDER WINDOW ASSEMBLY WITH MOVABLE PANEL DRIVE SYSTEM

CROSS REFERENCE TO RELATED APPLICATION

The present application claims the filing benefits of U.S. provisional application Ser. No. 62/705,767, filed Jul. 15, 2020, which is hereby incorporated herein by reference in its entirety.

FIELD OF THE INVENTION

The present invention relates to a slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window, such as via a cable drive system.

SUMMARY OF THE INVENTION

A rear slider window assembly has a drive system that uses a single threaded drive element or spindle to open and close the window. The window assembly and drive system include structure that connects the movable window panel to a threaded connector element at the drive element to move the window panel between an opened position and a closed position when the threaded drive element is rotated.

According to an aspect of the present invention, the rear slider window assembly includes a frame portion having an upper rail and a lower rail, a fixed window panel (defining an opening) that is fixed relative to the frame portion, and a movable window panel that is movable along the upper rail and the lower rail. The movable window panel is movable between a closed position, where the movable window panel is disposed at the opening, and an opened position, where the movable window panel is disposed at least partially along the at least one fixed window panel. A drive system is operable to move the movable window panel between the opened and closed positions. The drive system comprises a threaded drive element that, when the drive system is actuated to move the window panel in either direction, rotates to move a connector element along the drive element, where the connector element moves the movable window panel along the lower rail in the selected direction. For example, the drive system comprises (i) a housing attached at the fixed window panel, (ii) a drive motor disposed in the housing, (iii) a threaded shaft disposed in the housing and rotatably driven by the drive motor, (iv) a connecting element that threadedly receives the threaded shaft therethrough and (v) a window connector that is affixed to the movable window panel and that pivotally connects to the connecting element. Rotation of the threaded shaft imparts a translational movement of the connecting element along the shaft to move the movable window panel between the opened and closed positions. The threaded shaft may comprise a non-curved shaft and the path of travel of the movable window panel may be curved, whereby the pivotal connection of the window connector to the connecting element allows for pivoting of the connecting element relative to the window connector as the connecting element translates linearly along the threaded shaft and the movable window panel moves along the curved path.

These and other objects, advantages, purposes and features of the present invention will become apparent upon review of the following specification in conjunction with the drawings.

BRIEF DESCRIPTION OF THE DRAWINGS

FIG. 4A is a sectional view taken along the line A-A in FIG. 4;

FIG. 4B is a sectional view taken along the line B-B in FIG. 4;

DESCRIPTION OF THE PREFERRED EMBODIMENTS

Figure 1:
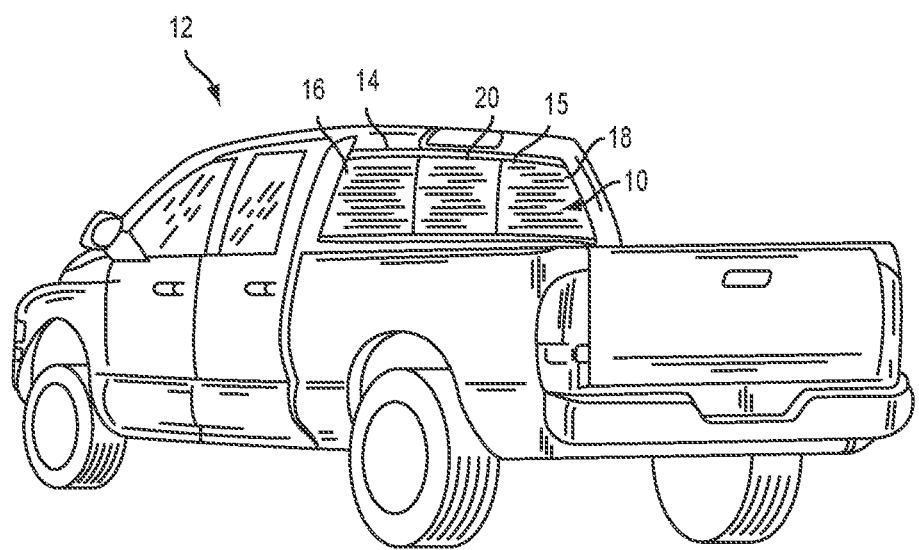
FIG. 1 is a rear perspective view of a pickup truck having a rear slider window assembly.
Figure 2:
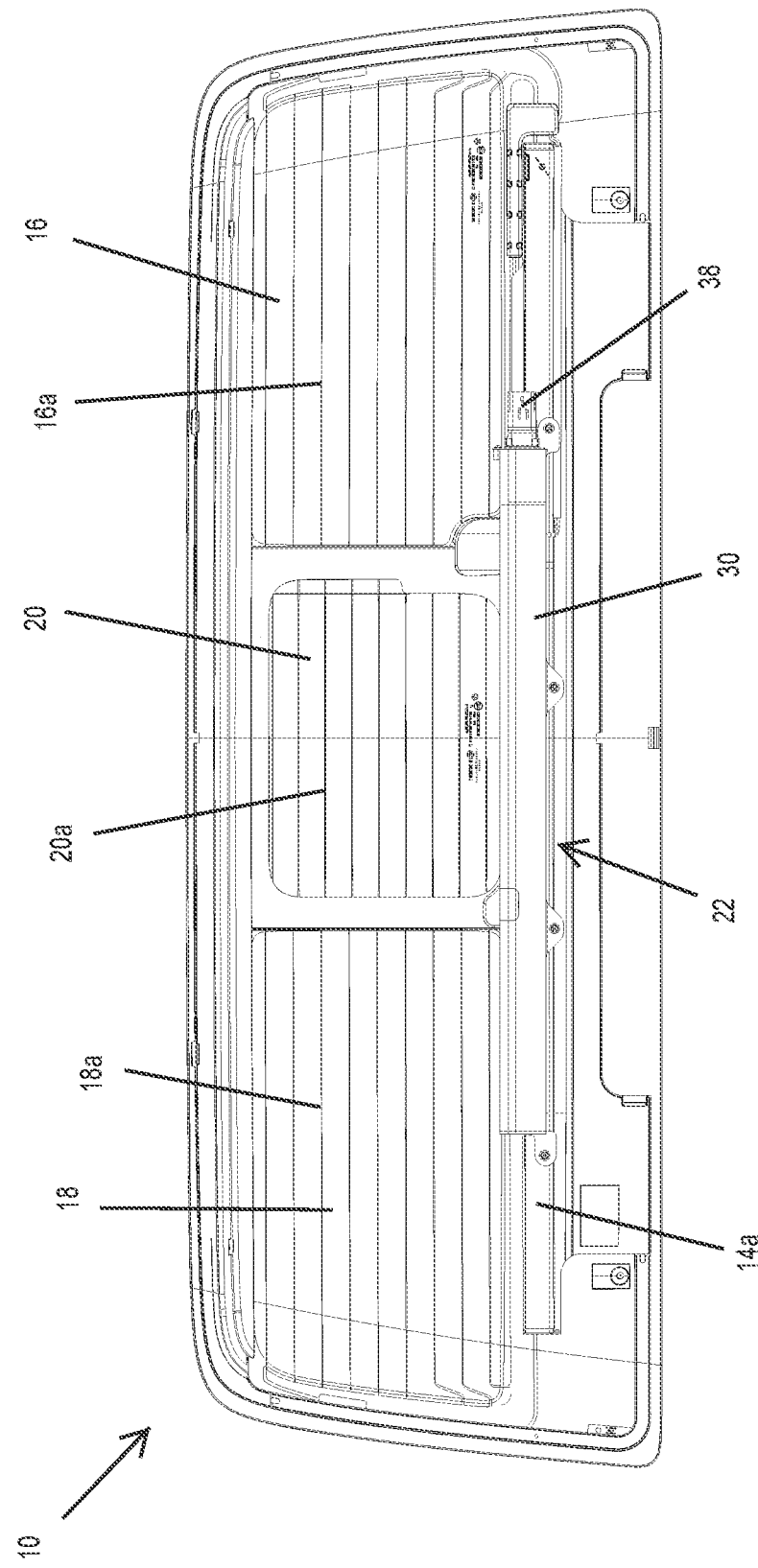
FIG. 2 is a front elevation of the interior side of the rear slider window assembly, which has a rotatable drive system.
Figure 3:
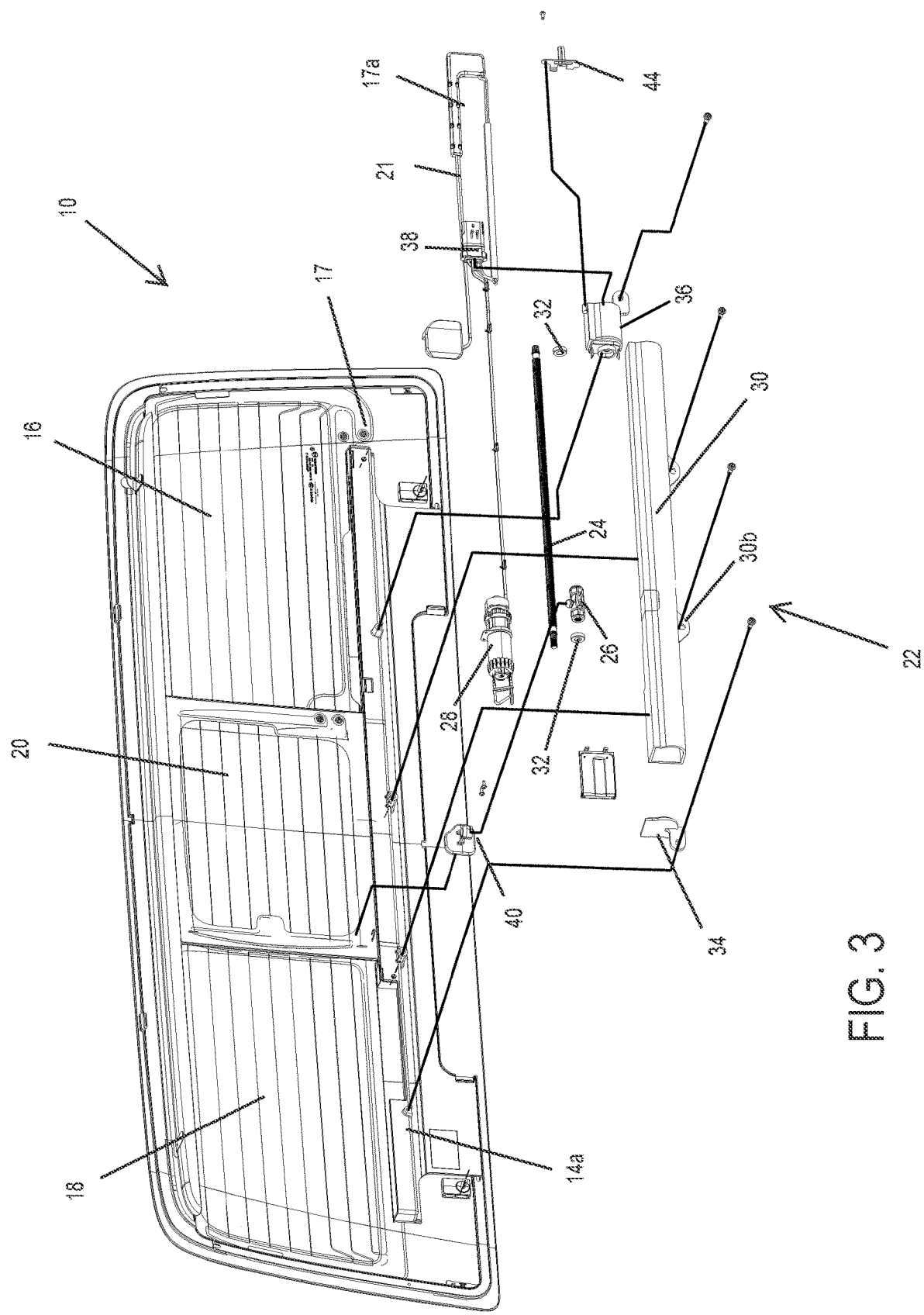
FIG. 3 is an exploded perspective view of the rear slider window assembly.

Referring now to the drawings and the illustrative embodiments depicted therein, a rear slider window assembly 10 of a vehicle 12 (such as a pickup truck or the like) includes a window frame 14, a fixed window panel 15 having an aperture that separates side window portions 16, 18 and a movable window panel 20 that is movable relative to the frame 14 and the fixed window panel between an opened position and a closed position (FIGS. 1-3). The movable window panel 20 is movable along the frame 14 (such as along upper and lower rails or channels of the frame) relative to the fixed window panel(s) via a drive system 22 that moves the movable panel in either direction to open and close the rear window, such as responsive to a user input or switch in the vehicle cabin. The rear slider window assembly may utilize aspects of the window assemblies and drive systems described in U.S. Pub. No. US-2019-0383084, which is hereby incorporated herein by reference in its entirety.

The drive system 22 comprises a rotatable threaded drive element 24, such as a linear screw drive element, that is disposed along the channel below and to one side of the opening. In other words, the drive system does not have two cables that function to pull at the movable window panel in either direction to open or close the window. Instead, the drive system moves the movable window in either direction (between the closed position and the opened position) via movement of a connector element or carriage 26 that moves along the threaded drive element 24 as the threaded drive element is rotated. When in the closed position, the movable window panel 20 is disposed at the aperture or opening between the side window portions 16, 18 of the fixed window panel 15. The movable window panel 20 is movable to the opened position, where the movable window panel 20 is disposed at least partially along the fixed window panel 15.

As best shown in FIG. 3, the drive system 22 includes a drive motor 28 and the drive element 24 disposed within a housing 30 that is attachable at the fixed window panel, such as at the lower rail 14a to position the drive element 24 along the lower rail. The drive motor 28 rotatably drives the drive element 24 via a mechanical brake/clutch device 28a of the drive motor engaging and connecting to an end of the drive element 24, with the drive element being rotatably supported at each end within a housing 30 via respective bushings and bearings 32. The threaded connector element 26 is disposed at the threaded portion 24a of the drive element 24 and, when the drive element is rotated, the connector element 26 moves longitudinally along the drive element to move the window panel 20. The housing 30 and the components housed therein are disposed along an outer surface of the lower rail and are not disposed within or interfere with the channel of the lower rail.

Figure 4:
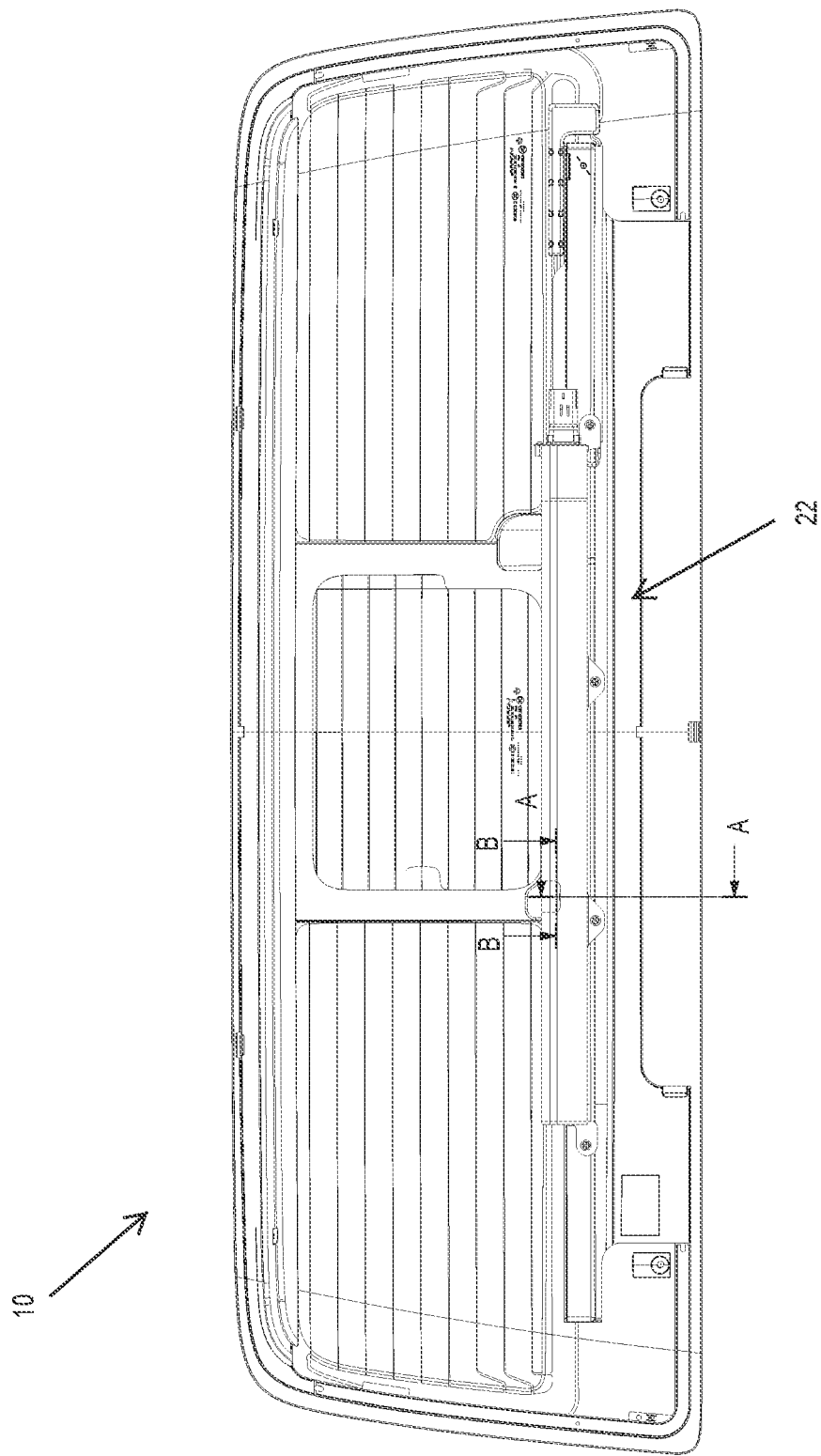
FIG. 4 is another front elevation of the rear slider window assembly.

The connector element 26 is disposed at and movable along the drive element 24, and is configured so that it cannot rotate with the drive element when the drive element is rotated. In the illustrated embodiment, and such as shown in FIG. 4A, the connector element comprises a threaded body 26a that threadedly receives the threaded portion 24a of the drive element 24 therethrough and that has at least one protrusion 26b (such as two protrusions as shown) that protrudes from the side of the connector element body 26a and that is received within a channel 30a formed at an inside part of the housing 30. Thus, when the drive element 24 is rotated, the connector element 26 is precluded from rotating with the drive element via engagement of the protrusion 26b and channel 30a and instead moves or travels longitudinally along the drive element and within the housing 30 to move the movable window panel. The channel 30a is formed along at least a portion of the length of the housing 30 so that, as the connector element 26 travels along the drive element 24, the protrusion 26b may move or travel within the channel 30a.

As best shown in FIG. 3, the drive system is attached at the lower rail via a plurality of fasteners or screws attaching the housing 30 to the lower rail 14a that is affixed to (such as adhesively bonded at) the fixed window panel(s). In the illustrated embodiment, the housing includes a pair of lower attachment flanges 30b and attachment flanges at respective end caps 34, 36 at the ends of the housing 30. The attachment flanges receive the fasteners or screws to attach the housing 30 at the lower rail 14a. The end cap 34 may comprise a plate that closes over the end of the housing 30, while the end cap 36 may comprise a connector passageway for wires of an electrical connector 38 that electrically connects to a vehicle wire harness for electrically powering the drive motor and the heater grids of the window panels, as discussed below. The end caps may comprise separate parts that snap onto or are otherwise attached at the ends of the housing, or may be formed as part of the housing and connect thereto via a living hinge portion of the housing or the like.

The movable window panel 20 is movably received within the channel of the lower rail 14a and includes a connector element or connector receiving element 40 that is attached at the inner side or surface of the movable window panel 20 facing the interior of the cabin of the vehicle. The connector receiving element 40 includes a base portion 40a that may be adhesively attached at the inner side or surface of the movable window panel and a receiving portion 40b that extends from the base portion and that is configured to receive a connecting portion 26c of the connector element 26. As shown in FIG. 4A, the receiving portion 40b is configured to receive the connecting portion 26c therein and the lobed/oblonged feature or ball member of the connecting portion 26c allows for pivotal movement of the connecting portion 26c relative to the receiving portion 40b, such as to allow for use of a straight or non-curved drive element 24 with a curved movable window panel 20 that may move along a slightly curved path. In other words, a curved movable window panel 20 movable by a straight drive element 24 may move along a curved path whereby the window panel 20 may be further from or closer to the drive element 24 at different positions along the curved path. Thus, as the movable window panel 20 travels closer to or farther away from the drive element 24, the receiving portion 40b of the connector receiving element 40 allows for pivotal movement of the ball member or oblonged connecting portion 26c to maintain engagement of the connecting portion 26c and receiving portion 40b while accommodating the variation in distance between the movable window panel 20 and drive element 24.

Optionally, the drive element may comprise a flexible threaded element that may flex to accommodate the movement of the connecting element and movable window panel along the curved path as the movable window panel is moved between the opened and closed positions. In the illustrated embodiment, the connecting portion 26c comprises a partial spherical or lobed member while the receiving portion 40b comprises a socket portion that receives the partial spherical member therein. A clip or fastening element 42 (FIG. 4B) may be used to retain the connecting portion 26c in the receiving portion 40b as the connector element 26 travels along the drive element 24 to move the connector receiving element 40 and movable window panel 20, while allowing for pivotal movement of the connecting portion within the receiving portion.

In the illustrated embodiment, the window assembly comprises a heater grid 16a, 18a and 20a established at each of the window panels or portions 16, 18 and at the movable window panel 20, respectively. The heater grids 16a, 18a are electrically connected at an electrical connection location 17 at the window panel, with the heater grid 18a being electrically connected at the connection location 17 or to the heater grid 16a, such as via electrical busbars extending across the fixed window panel or such as via one or more jumper wires electrically connecting between the connection location 17 and the heater grid 18a. The heater grid 20a is electrically connected to the connection location 17 via a flexible electrical connector or cable or wires 21 that provides electrical power to the heater grid 20a throughout the range of movement of the movable panel between its opened and closed positions (and the flexible electrical connector 21 may electrically connect to a pair of contact pads or terminals soldered or otherwise affixed at the connection location 17). In other words, the heater grid 20a may be electrically connected to the connection location 17 via an electrical connector or cable or wires 21 that travel with the movable window panel 20. The heater grids and the electrical connections may utilize aspects of the window assemblies described in U.S. Pat. Nos. 10,524,313; 9,579,955; 8,938,914; 8,881,458 and/or 8,402,695, and/or U.S. Publication No. US-2018-0079379, which are hereby incorporated herein by reference in their entireties.

Figure 5:
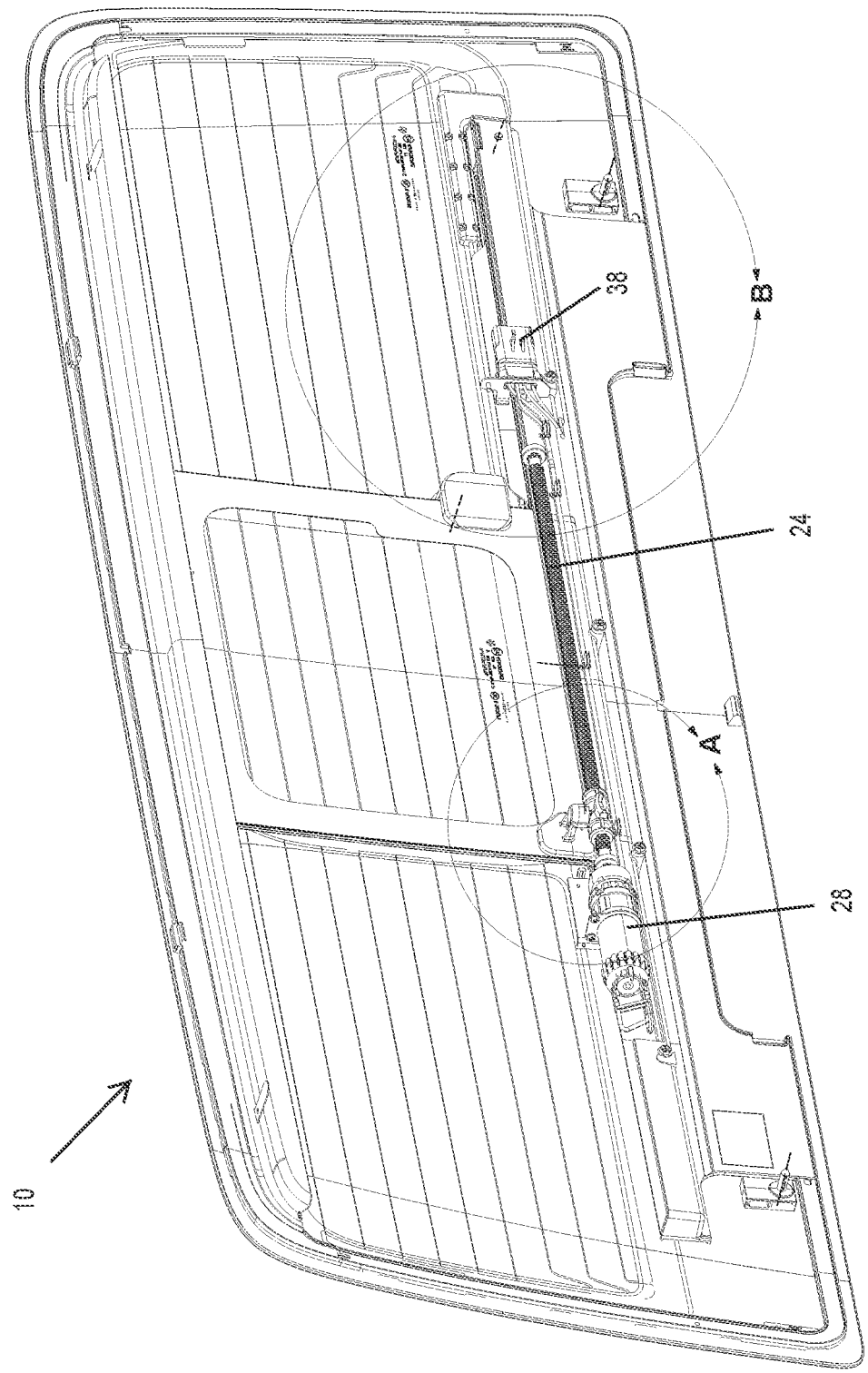
FIG. 5 is a front perspective view of the rear slider window assembly, shown with the housing of the drive system removed to show additional details.
Figure 5B:
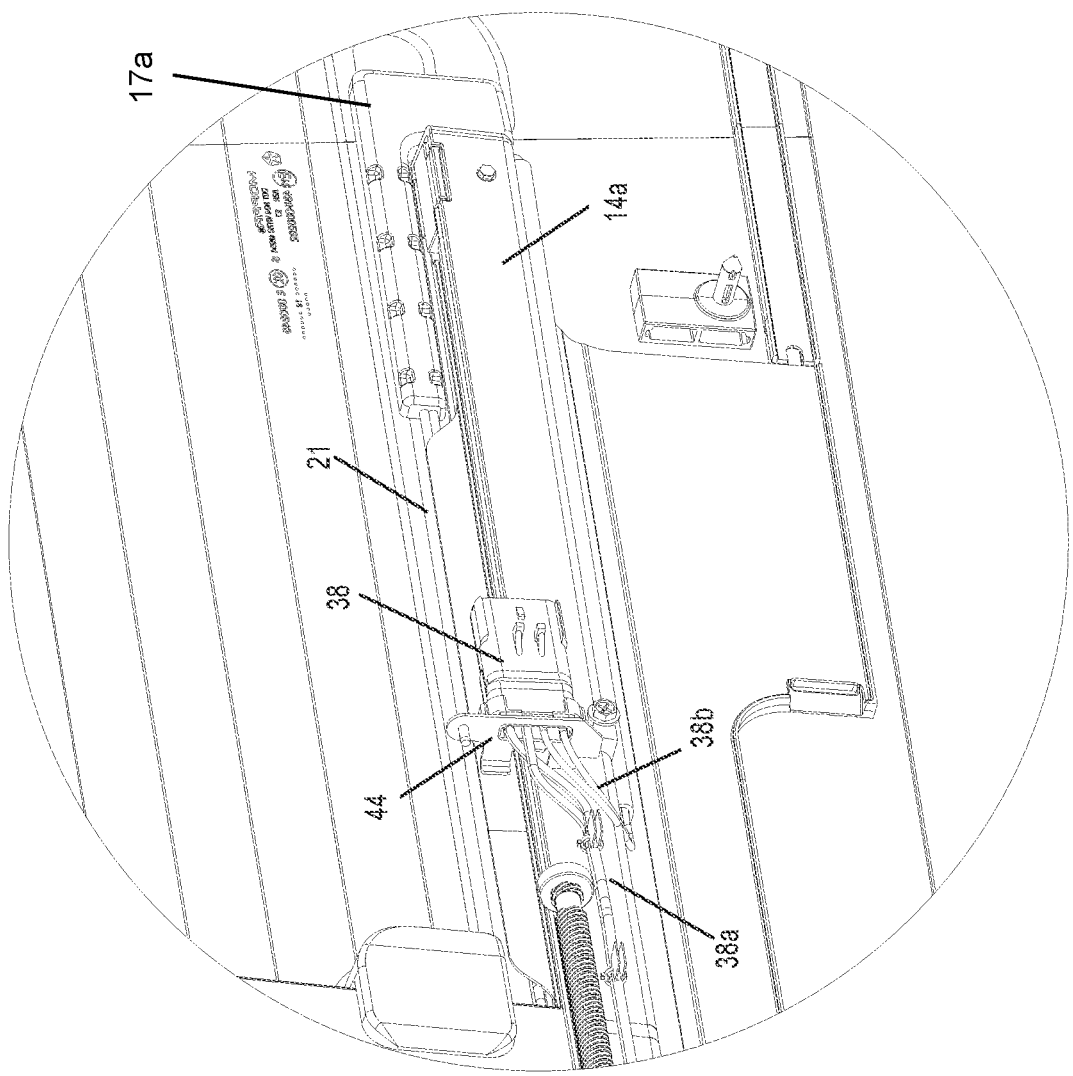
FIG. 5B is an enlarged perspective view of the area B in FIG. 5.
Figure 5A:
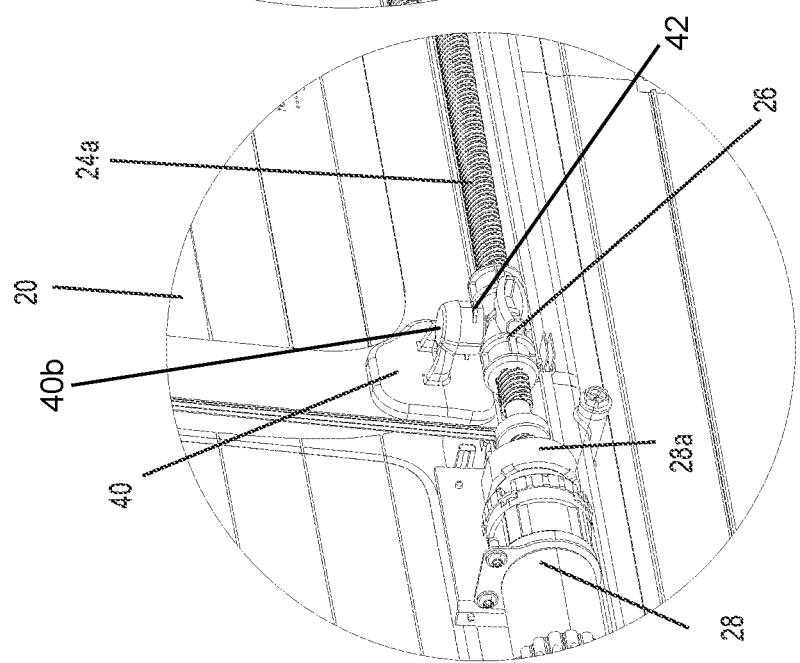
FIG. 5A is an enlarged perspective view of the area A in FIG. 5.
Figure 6:
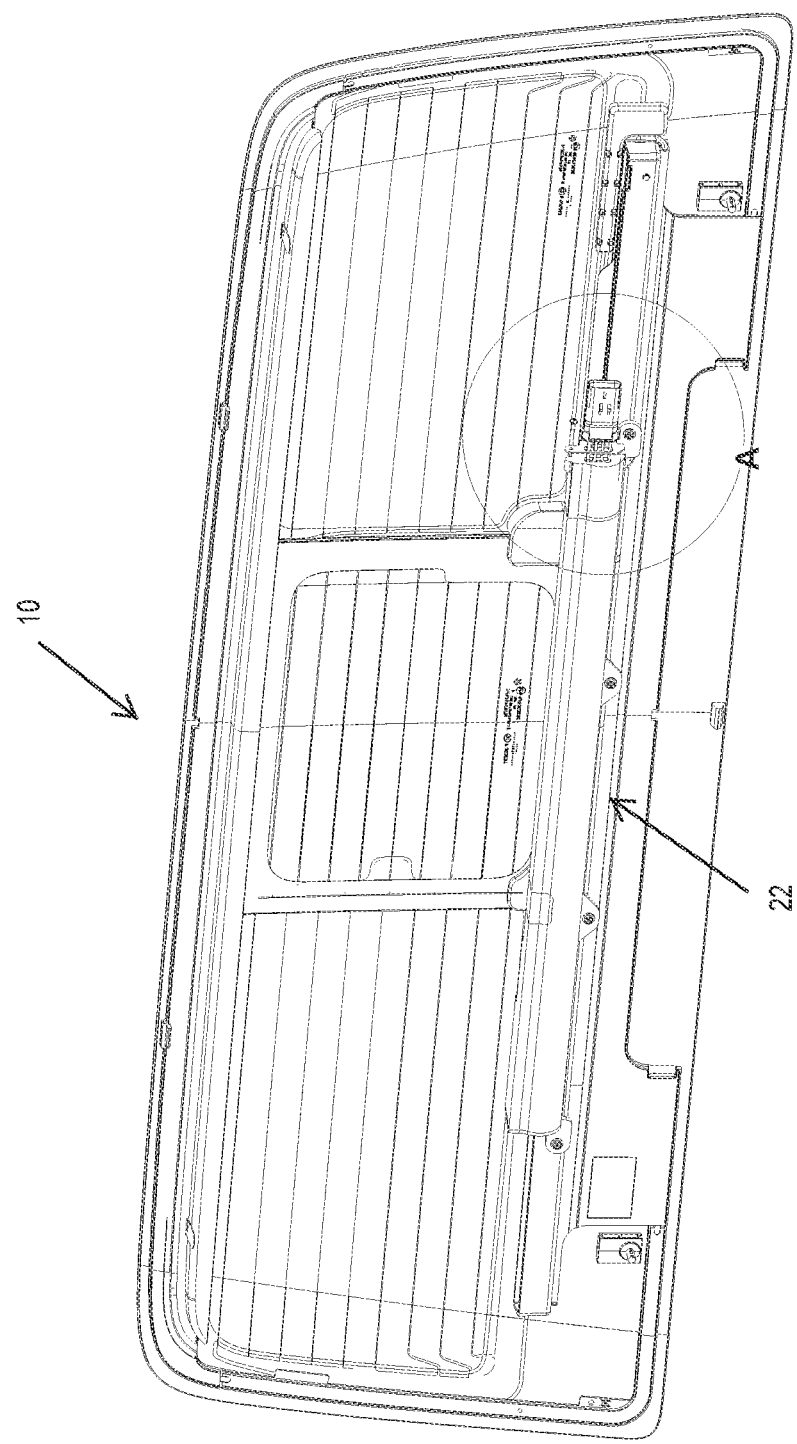
FIG. 6 is another front perspective view of the rear slider window assembly.
Figure 6A:
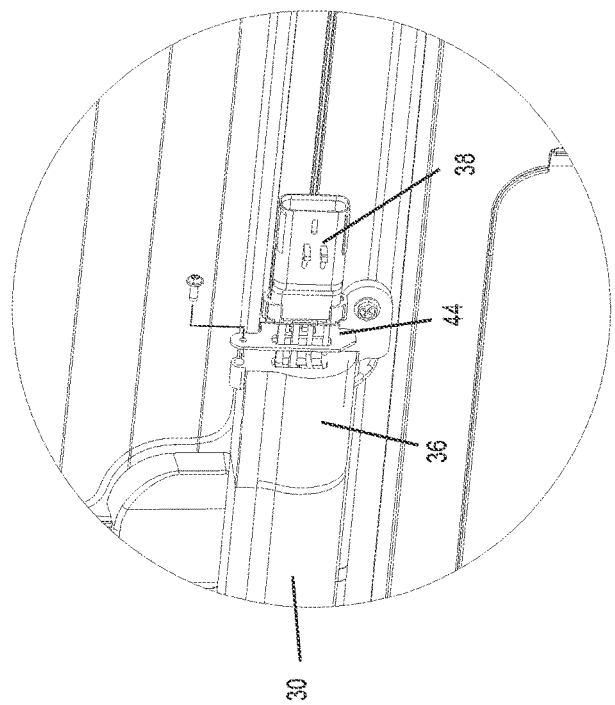
FIG. 6A is an enlarged perspective view of the area A in FIG. 6.
Figure 7A:
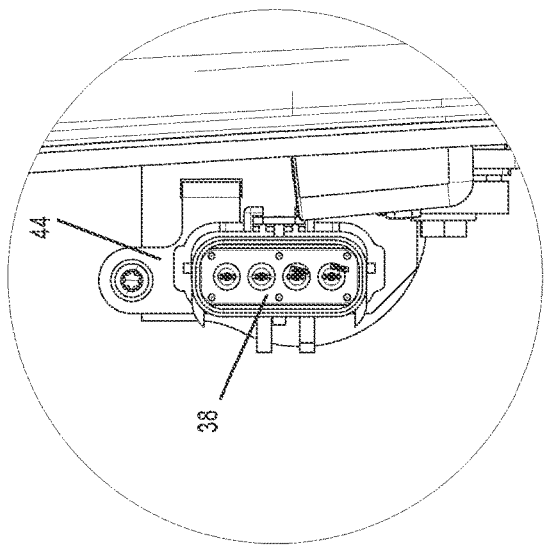
FIG. 7A is an enlarged view of the area A in FIG. 7.
Figure 7:
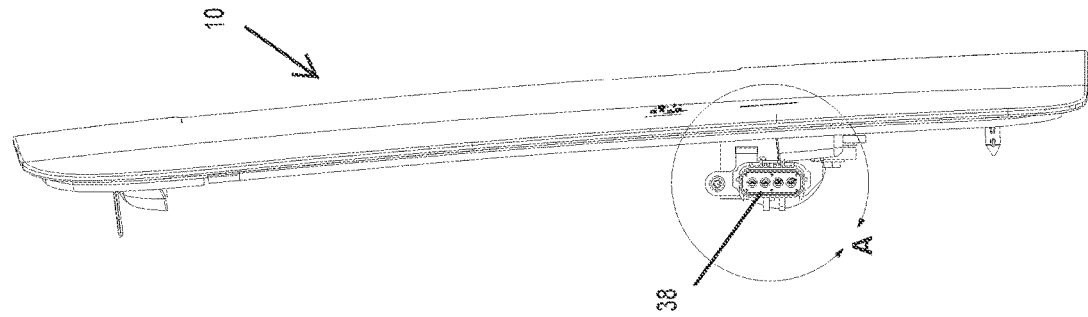
FIG. 7 is a side elevation of the rear slider window assembly.

In the illustrated embodiment, the electrical connector 38 at the end of the housing is configured for electrical connection to a single wire harness of the vehicle for powering both the drive motor 28 and the heater grids (via connection at the connection location 17 at the fixed window panel). As best shown in FIGS. 5-7, the connector 38 is attached at the end cap 36 via an attaching plate 44 to affix the connector 38 at the end cap at the end of the housing 30, whereby the vehicle wire harness can be readily electrically connected to the connector 38 (such as via a plug and socket connection).

The connector 38 includes four terminals or pins that are electrically connected to respective leads or wires, with two wires 38a for powering/controlling the drive motor 28 and with two wires 38b for powering/controlling the heater grids. The two wires 38a for powering/controlling the drive motor 28 extend into the housing 30 and along and within the housing to electrically connect to the drive motor 28 (optionally, however, the motor and connector may be disposed at the same end of the housing), and the two wires 38b for powering/controlling the heater grids extend into the housing and out of a lower wall of the housing and back along the lower rail 14a to the connection location 17 (so as to connect to, for example, a pair of snap terminals or spade terminals soldered or otherwise affixed at the connection location). The terminals for connecting to the wires 38b and/or to the flexible connector or cable or wires 21 are disposed at electrically conductive busbars at the fixed window panel 16 and may be covered by a cover plate 17a.

Thus, the drive system 22 may be provided as a unit and affixed at and along the lower rail 14a of the window assembly 10 via fasteners. The connector receiving element 40 at the movable window panel receives or connects to the connector element 26 at the drive element or spindle 24, with the receiving portion 40b of the connector receiving element 40 protruding through a slot 46 (FIG. 4A) formed at the connector receiving element and between the upper wall of the housing 30 and the lower rail 14a. The drive motor 28 and drive element 24 are contained within the housing 30, with the drive element rotatably supported at support structure within the housing and the connecting element 26 guided along structure (e.g., the channel 30a) within the housing as it translates along the drive element when the drive element is rotated. The housing may comprise a plastic injection molded housing, with the structure for supporting the motor and the drive element, and the structure for non-rotatably guiding the connecting element along the housing, being formed at the interior surface of the housing.

When the housing is attached at the window assembly, the electrical connector 38 and the end plate cap 36 may be detached from the end of the housing 30. This allows for the wires 38b from the connection location 17 to be routed into the housing 30 and through the aperture in the end cap and into the electrical connector 38 with the housing already attached at the window assembly. After the wires 38b are plugged into the connector 38, the end cap 36 and attaching plate 44 (and connector 38) are attached at the end of the housing. Optionally, the end cap 36 may be attached at the end of the housing when the housing is attached at the window assembly, whereby the wires 38a, 38b are routed through the end cap and through its aperture and through the aperture in the attaching plate and plugged into the connector 38. If the end cap is detached when the housing is attached at the window assembly, the wires are routed in a similar manner, and the end cap is attached at the end of the housing and the fastener attaches the flange of the end cap at the lower rail.

When the drive system is fully attached at the window assembly and the connector is electrically connected to the wires of the window assembly, the window assembly may be installed as a unit at the vehicle, whereby a single electrical connection to a connector end of a wire harness of the vehicle electrically connects the vehicle power/control to both the drive motor and the heater grids. Actuation of the drive system (such as via actuation of a user actuatable input or button or switch in the cabin of the vehicle) rotates the drive element, which imparts linear or translational movement of the connecting element and movable window panel to move the movable window panel between its opened and closed positions. Thus, examples of the drive systems described herein provide for opening and closing of the rear slider window assembly via a rotatable drive element that rotates to move the movable window panel in either direction (such as to open or close the window).

Optionally, for window assemblies that include the drive system, but that do not include the heater grids, the drive system is the same as described above, and because the heater grid wires are not present, the step of routing those wires into the connector is not needed to complete the attachment of the drive system at the window assembly. Optionally, for window assemblies that do not include the drive system, but that do include the heater grids, a separate connector may be electrically connected at the connection location of the window and may extend therefrom for electrical connection to a connector end of a vehicle wire harness. For example, a short wire (e.g., a wire having a length of 2-3 inches or thereabouts) may be connected at the connection location with the same or common four-pin connector (even though only two wires may be connected to the connector) to connect to a common connector of the vehicle wire harness. Optionally, in a manual window embodiment, a housing 30 and electrical connector 38 may still be mounted at the lower rail in a similar manner as described above, but without the internal components of the drive system being present, such that the wires 38b are the only wires that are electrically connected to the connector 38, whereby a common vehicle wire harness connector can be used to electrically connect to the window assembly irrespective of whether the window assembly has the drive system, the heater grids, or both. Thus, the window assembly provides for a single combined connector for both the defrosting heater grids and the drive motor connection and provides a common connector for the heater grids for a manual (no drive system) window assembly.

The drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293; 8,151,519 and/or 8,938,914, and/or U.S. Publication Nos. US-2019-0383084; US-2017-0356231; US-2008-0127563; and/or US-2004-0020131, which are all hereby incorporated herein by reference in their entireties.

In the illustrated embodiments, the window assembly comprises a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween. The fixed window panels may comprise two separate spaced apart fixed window panels that define the opening therebetween (and with upper and lower appliqués or trim or filler panels or elements disposed at the upper and lower regions of the opening and between the fixed window panels, and thus with the lighting device disposed behind the upper appliqué or the like).

The benefits of embodiments of the window assemblies may also be realized in sliding window constructions where an aperture is created in a fixed window panel and where a movable window panel can be made to open or close the aperture. Slider windows of this type are disclosed such as in U.S. Pat. Nos. 8,915,018 and/or 8,881,458, and/or U.S. Publication No. US-2003-0213179 and/or RE41502, which are hereby incorporated herein by reference in their entireties. The benefits of embodiments of the window assemblies may also be realized in vehicular movable window assemblies other than a rear slider window assembly for a pickup truck or the like, such as (for example) a slider window assembly suitable for use as a movable side window for a vehicle such as a van or a bus.

Optionally, the window assembly or assemblies may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2006-0107600; US-2008-0127563; US-2004-0020131 and/or US-2003-0213179, and/or International Publication No. WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular slider window assembly, the vehicular slider window assembly comprising:
   a frame portion having an upper rail and a lower rail;
   a fixed window panel that is fixed relative to the frame portion, the fixed window panel at least in part defining an opening;
   a movable window panel that is movable along the upper rail and the lower rail, wherein the movable window panel is movable between a closed position, where the movable window panel is disposed at the opening, and an opened position, where the movable window panel is disposed at least partially along the fixed window panel;
   a drive system operable to move the movable window panel along a curved path of travel between the opened position and the closed position, wherein the drive system comprises (i) a housing attached at the fixed window panel, (ii) a drive motor disposed in the housing, (iii) a threaded shaft disposed in the housing and rotatably driven by the drive motor, (iv) a connecting element having a threaded body that threadedly receives the threaded shaft therethrough and (v) a window connector that is affixed to the movable window panel and that pivotally connects to the connecting element;
   wherein rotation of the threaded shaft imparts a translational movement of the connecting element along a longitudinal axis of the threaded shaft to move the movable window panel along the curved path of travel between the opened and closed positions;
   wherein the window connector pivotally connects to the connecting element via a ball-and-socket connection, and wherein the movable window panel moves along the curved path of travel together and in tandem with translational movement of the connecting element and the window connector;
   wherein the threaded shaft comprises a non-curved threaded shaft, and wherein, as the connecting element translates along the longitudinal axis of the threaded shaft to move the movable window panel along the curved path of travel, the connecting element pivots relative to the window connector via the ball-and-socket connection to accommodate non-parallel movement of the connecting element and the window connector; and
   wherein a portion of the threaded body engages the housing to limit rotation of the threaded body about the threaded shaft while allowing for translational movement of the threaded body along the threaded shaft.

2. The vehicular slider window assembly of claim 1, wherein the ball-and-socket connection comprises a ball member of the connecting element and a receiving portion of the window connector that pivotally receives the ball member.

3. The vehicular slider window assembly of claim 1, wherein the housing comprises a channel formed at an inner portion of the housing, and wherein the portion of the threaded body comprises a protrusion that moves along and within the channel while the threaded body translates along the threaded shaft as the threaded shaft is rotated.

4. The vehicular slider window assembly of claim 1, wherein the drive system comprises an electrical connector disposed at an end of the housing for electrically connecting to a vehicle wire harness when the vehicular slider window assembly is mounted at a vehicle.

5. The vehicular slider window assembly of claim 4, wherein the vehicular slider window assembly includes a heater grid on the fixed window panel and a heater grid on the movable window panel, and wherein the heater grids are electrically connected to the electrical connector, and wherein the vehicle wire harness electrically connects to the drive motor and the heater grids via electrical connection to the electrical connector at the end of the housing of the drive system.

6. The vehicular slider window assembly of claim 1, wherein the fixed window panel comprises a single fixed window panel having the opening therethrough.

7. A vehicular slider window assembly, the vehicular slider window assembly comprising:
   a frame portion having an upper rail and a lower rail;
   a fixed window panel that is fixed relative to the frame portion, the fixed window panel at least in part defining an opening;
   a movable window panel that is movable along the upper rail and the lower rail, wherein the movable window panel is movable between a closed position, where the movable window panel is disposed at the opening, and an opened position, where the movable window panel is disposed at least partially along the fixed window panel;
   a drive system operable to move the movable window panel along a curved path of travel between the opened position and the closed position, wherein the drive system comprises (i) a housing attached at the fixed window panel, (ii) a drive motor disposed in the housing, (iii) a threaded shaft disposed in the housing and rotatably driven by the drive motor, (iv) a connecting element having a threaded body that threadedly receives the threaded shaft therethrough, (v) a window connector that is affixed to the movable window panel and that pivotally connects to the connecting element, and (vi) an electrical connector disposed at an end of the housing for electrically connecting to a vehicle wire harness when the vehicular slider window assembly is mounted at a vehicle;

wherein a first heater grid is disposed on the fixed window panel and a second heater grid is disposed on the movable window panel;

wherein the first and second heater grids are electrically connected to the electrical connector, and wherein the vehicle wire harness electrically connects to the drive motor and the first and second heater grids via electrical connection to the electrical connector at the end of the housing of the drive system;

wherein rotation of the threaded shaft imparts a translational movement of the connecting element along a longitudinal axis of the threaded shaft to move the movable window panel along the curved path of travel between the opened and closed positions;

wherein the window connector pivotally connects to the connecting element via a ball-and-socket connection, and wherein the movable window panel moves along the curved path of travel together and in tandem with translational movement of the connecting element and the window connector;

wherein, as the connecting element translates along the longitudinal axis of the threaded shaft to move the movable window panel along the curved path of travel, the connecting element and the window connector pivot relative to one another via the ball-and-socket connection to accommodate non-parallel movement of the connecting element and the window connector; and wherein a portion of the threaded body engages the housing to limit rotation of the threaded body about the threaded shaft while allowing for translational movement of the threaded body along the threaded shaft.

8. The vehicular slider window assembly of claim 7, wherein the ball-and-socket connection comprises a ball member of the connecting element and a receiving portion of the window connector that pivotally receives the ball member.

9. The vehicular slider window assembly of claim 7, wherein the threaded shaft comprises a flexible shaft, and wherein, as the connecting element translates linearly along the flexible shaft and the movable window panel moves along the curved path, the flexible shaft flexes to partially accommodate movement of the movable window panel along the curved path.

10. The vehicular slider window assembly of claim 7, wherein the housing comprises a channel formed at an inner portion of the housing, and wherein the portion of the threaded body comprises a protrusion that moves along and within the channel while the threaded body translates along the threaded shaft as the threaded shaft is rotated.

* * * * *

UNITED STATES PATENT AND TRADEMARK OFFICE
CERTIFICATE OF CORRECTION

PATENT NO. : 11,952,820 B1
APPLICATION NO. : 17/305818
DATED : April 9, 2024
INVENTOR(S) : Darin J. Snider et al.

It is certified that error appears in the above-identified patent and that said Letters Patent is hereby corrected as shown below:

In the Specification

<u>Column 5</u>
Line 7, "at the end of the housing is configured" should be --at the end of the housing 30 is configured--

Signed and Sealed this
Seventh Day of May, 2024

Katherine Kelly Vidal
*Director of the United States Patent and Trademark Office*